12-71 SE
T08109 09 RE 28,311

Jan. 21, 1975 G. A. CUMMINGS Re. 28,311

DISPENSING APPARATUS

Original Filed March 29, 1971 3 Sheets-Sheet

United States Patent Office

Re. 28,311
Reissued Jan. 21, 1975

28,311
DISPENSING APPARATUS

Gilbert A. Cummings, Norwell, Mass., assignor to Peters & Co., Inc., Boston, Mass.

Original No. 3,694,044, dated Sept. 26, 1972, Ser. No. 128,708, Mar. 29, 1971, which is a continuation-in-part of abandoned application Ser. No. 1,379, Jan. 8, 1970. Application for reissue Aug. 29, 1973, Ser. No. 392,670
Int. Cl. A47f *1/00*
U.S. Cl. 312—71 16 Claims

Matter enclosed in heavy brackets [ ] appears in the original patent but forms no part of this reissue specification; matter printed in italics indicates the additions made by reissue.

ABSTRACT OF THE DISCLOSURE

This invention has to do with a dispensing apparatus of the self-leveling balanced beam or lever type in which one load, an elevator, is balanced by another load, a spring, and in which a mechanism is interposed between the spring and the elevator to permit adjustment for stacks of different masses on the elevator. The embodiment shown consists of a second-degree lever in which the points of fulcrum action and force application can be changed. Illustrated are: a curved lever and a follower adjustable therealong to vary the point of attachment of a load, in particular the spring load, in a system where both loads are attached through elongated flexible elements; a fulcrum for a lever adjustable in space to vary the moment arm for at least one of the loads, thereby to vary the dynamic range; adjusting a fulcrum by moving a swingable arm; mounting a lever on a swingable arm and connecting a load to the lever at a distance from this connection corresponding to the arm length by means of an elongated flexible element that passes about a pulley near the mounting of the swingable arm, thence to the load; and a system of stationary axis pulleys with any of the above, permitting straight line movement of the loads while permitting rotation of the lever assembly.

This application is a continuation-in-part of my copending application Ser. No. 1,379, filed Jan. 8, 1970, *and now abandoned.*

BACKGROUND OF THE INVENTION

In the dispensing of trays, glass and cup racks, dishes, saucers and the like, particularly in food service operations, it has been common practice to provide a table having an internal elevator on which the dispensed articles can be stacked. By properly balancing the elevator, the top of the stack of articles remains at a constant level at all times. In the past, most of these elevators have been balanced by use of one or more coil springs and, when the type of article is changed (particularly so far as weight is concerned), it has been necessary to change the spring or spring attachment location. It has been suggested that the spring effect can be regulated by use of a lever interposed between the spring and the elevator and by adjusting the point of application of the spring to the lever. Such apparatus has been less than successful, however, because of the complications of the mechanism and because it is difficult for unskilled labor to make the necessary adjustment in shifting from one type of dispensed article to another, and there has not been available an adequate range of adjustment to accommodate the various commonly used items of food service ware. Part of the problem exists in the fact that such adjustments are non-linear and do not lend themselves to ease of calibration. These and other difficulties experienced with the prior art devices have been obviated in a novel manner by the present invention.

It is, therefore, an outstanding object of the invention to provide a dispensing apparatus in which a rapid adjustment can be made when different weights of dispensed articles are used.

Another object of this invention is the provision of a dispensing apparatus having a simple and rugged mechanism for adjusting the elevator spring constant, which apparatus is inexpensive to manufacture and which is capable of a long life of useful service with a minimum of maintenance.

A further object of the present invention is the provision of a dispensing apparatus having a mechanism for adjusting the spring constant for the elevator, wherein the adjusting means operates in a linear manner.

With these and other objects in view, as will be apparent to those skilled in the art, the invention resides in the combination of parts set forth in the specification and covered by the claims appended hereto.

SUMMARY OF THE INVENTION

In general, the invention consists of a self-leveling dispensing apparatus having a frame on which is slidably mounted an elevator.

One aspect of the invention is a lever mounted for pivotal movement about an axis at one end, the lever having a curved surface. A spring is connected at one end to the frame and at the other end through connection means to an intermediate portion of the lever and a first elongated flexible element connects the other end of the lever to the elevator. The connecting means for the spring provides for adjusting the point of connection of the spring to the intermediate portion and includes a follower that is adjustably movable along the surface of the lever, with the follower being connected to the spring by a second elongated flexible element.

Preferred embodiments of this aspect feature a first pulley having a stationary axis against which the first elongated flexible element is trained between the lever and the elevator and a second pulley having a stationary axis against which the second elongated flexible element is trained between the lever and the spring. The pulleys serve to permit straight line movement of the portions of the flexible elements extending from the pulleys toward the elevator and spring despite displacement of the lever and the portions of the flexible elements connected thereto. Preferred embodiments of this aspect also feature: one end of the lever connected to one part of the frame by a swingable arm, and an adjustable length element connecting the one end of the lever to another part of the frame substantially spaced apart therefrom; the adjustable length element as a nut pivotally attached to the lever and a screw extending from the nut to the frame, with a handle mounted externally of the frame to turn the screw; the screw connected to the frame for pivotal movement; the radius of curvature of the surface of the lever the same as the length of the swingable arm; and the arrangement in which the one end of the lever that is connected to one part of the frame being connected by a swingable arm, with means for adjusting the position of the arm, the first flexible element connected to the lever at a point spaced from the one end of the lever a distance substantially corresponding to the length of the swingable arm, and a pulley positioned near the pivot point of the swingable arm, the first flexible element extending about this pivot point, thence to the elevator, and in particular wherein the pulley is concentric with the pivot point of the swingable arm.

Another aspect of the invention features a lever constructed and arranged to act as a balanced beam between loads, a spring connected at one end to the frame and at the other end to the lever and providing a first load, means connecting the lever to the elevator to provide a second load, and means for adjusting the effective moment arms of at least one of the loads for varying the effective spring rate of the dispenser. The lever is pivotally mounted on a swingable arm mounted on the frame with the position of the arm variable during use of the apparatus; and elongated flexible element is connected to the lever for applying one of the loads and extends from a point on the lever about a pulley thence to the load; the pulley is positioned near the mounting of the swingable arm and is substantially in line with the path of the lever when it moves about its pivot on the arm and the point of connection of the elongated flexible element to the lever is spaced from the pivot connection to the arm a distance substantially the same as the length of the swingable arm.

Preferably with this aspect the elongated flexible element is connected to the lever by means of a pulley carried on the lever, about which the flexible element is looped, one end of the flexible element being secured to the frame.

According to another aspect of the invention, the self-leveling dispensing apparatus comprises a frame, an elevator slidably mounted on the frame or otherwise suspended, and a lever constructed and arranged to act as a balanced beam between loads; a spring is connected at one end to the frame and at the other end to the lever, providing a first load; there is a means connecting the lever to the elevator to provide a second load; and a means for adjusting the effective moment arms of at least one of said loads for varying the effective spring rate, this means comprising an adjustable member for moving the fulcrum point of the beam. Preferred embodiments of this aspect of the invention feature the fulcrum of the beam carried on the end of a swingable arm, the arm mounted on the frame, and means to adjust the angular position of the arm, thereby to vary the position of the fulcrum along the arc defined by the arm; the fulcrum permanently positioned at one end of the lever, and the apparatus constructed and arranged so that rotation of the swingable arm and the fulcrum is effective to move the lever relative to the line of action of the spring; each of the loads applied to the lever by an elongated flexible element, there being first and second stationary pulleys, and each of the flexible elements extending from the lever about a respective pulley, thence to the respective load.

According to still another aspect of the invention the self-leveling dispensing apparatus comprises a frame, an elevator slidably mounted on the frame, a lever mounted on the frame for pivotal movement about an axis at one end, a spring connected at one end to the frame and at the other end to an intermediate portion of the lever, an elongated flexible element connecting the other end of the lever to the elevator, and means for adjusting the point of connection of the spring to the intermediate portion, wherein the one end of the lever is connected to one part of the frame by a swingable arm, and wherein an adjustable-length element connects the one end of the lever to another part of the frame substantially spaced from the one part.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
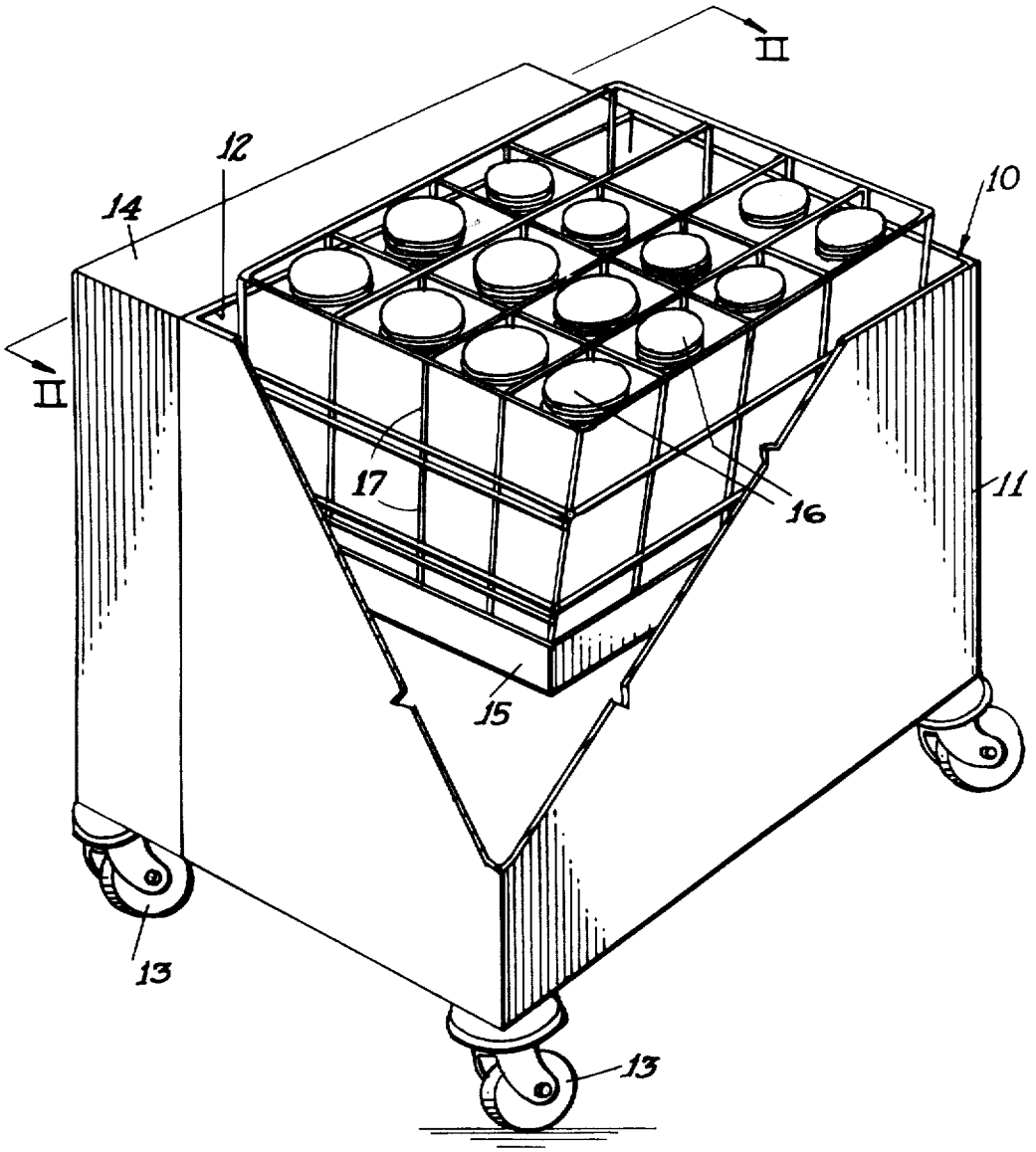
FIG. 1 is a perspective view with a portion broken away of a dispensing apparatus embodying the principles of the present invention.

Referring first to FIG. 1, wherein are best shown the general features of the invention, the dispensing apparatus, indicated generally by the reference numeral 10, is shown as having a generally cube-shaped enclosure 11 having an opening 12 at its upper surface. The enclosure may be provided at the lower corners with casters 13. Along one side of the enclosure is a frame 14 on which is slidably mounted an elevator 15. Mounted on the elevator is a series of articles 16 to be dispensed. In the illustration, these articles are shown as glasses carried in stacked racks 17. The top rack 17 and its glasses 16 extend upwardly through the opening 12 in the enclosure.

Figure 2:
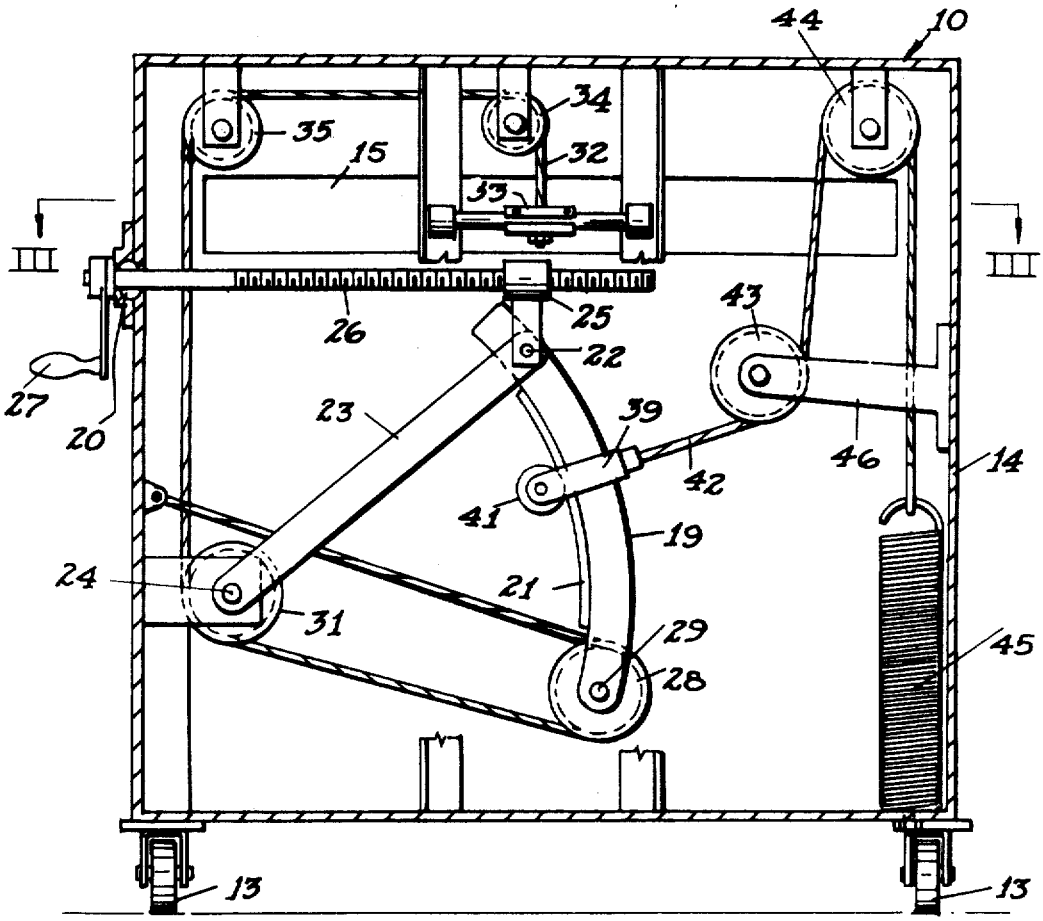
FIG. 2 is a sectional view of the invention taken on the line II—II of FIG. 1.
Figure 3:
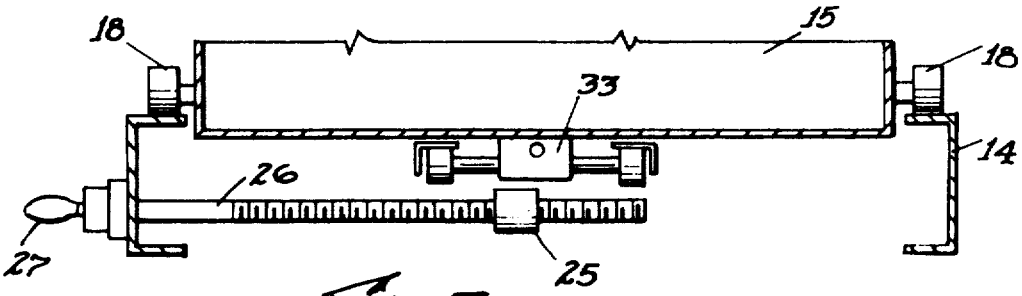
FIG. 3 is a sectional view of the invention taken on the line III—III of FIG. 2.

In FIGS. 2 and 3, it can be seen that the elevator 15 is provided with rollers 18 at the sides by which it is guided in the frame 14 for vertical movement. A lever 19 is mounted centrally of the frame in a generally vertical direction and is provided with a circular arcuate surface 21. The upper end of the lever 19 is connected by a pivot pin 22 to one end of a swingable arm 23, the other end of which is connected by a pivot pin 24 to the frame 14. The surface 21 has a radius of curvature equal to the length of the arm 23. Also pivotally connected to the lever 19 by the pivot pin 22 is a nut 25 which is threadedly engaged with a threaded shaft 26 which is rotatably and pivotally mounted in the frame 14 by means of a universal joint, such as a ball joint 20, and extends externally thereof where it is provided with a crank handle 27. The lower end of the lever 19 is provided with a sheave 28 rotatably mounted on a pivot pin 29. A similar sheave 31 is rotatably mounted on the pivot pin 24. The distance between pivot pins 22 and 29 corresponding substantially to the radius of the swingable arm, between pivot pins 22 and 24. An elongated flexible element, such as a cable 32, is connected to flange 33 at one side of the elevator 15, and extends vertically upwardly and around a pulley 34 connected to the upper part of the frame, and passes over a sheave 35 also rotatably mounted on the upper part of the frame. From the sheave 35 the cable 32 extends downwardly around the sheave 31 and the sheave 28 and finally is fastened to the lower part of the frame.

Located in an intermediate portion of the lever 19 is a slide or follower 39 having a roller 41, which roller engages the surface 21 of the lever. The slide 39 is connected to an elongated flexible element, such as a cable 42, which extends around a pulley 43 and a pulley 44 to one end of a large coil spring 45, the other end of which is fixed to the bottom of the frame 14. The pulley 44 is attached to the upper part of the frame, while the pulley 43 is connected to the frame and fixed in place by means of a pair of arms 46.

The operation of the invention will now be readily understood in view of the above description. The lever 19 should be visualized as a second-degree lever in which the pivot pin 22 constitutes the fulcrum, and in which two forces are applied in opposite directions. One force in the intermediate portion of the lever is the force due to the stressing of the spring 45, while the other force operating on the lower end of the lever is the weight of the elevator and its contents as carried to the lever through the cable 32. The force due to the elevator 15 and its load is always applied to the extreme end of the lever, but the force from the spring 45 is applied to the intermediate portion of the lever in a position determined by the position of the pivot pin 22. By adjusting the position of the pivot pin 22 (and, therefore, the position of the slide 39 on the lever), it is possible to adjust the effect of the spring 45 on the elevator to match various weights of articles carried on the elevator. The rotation of the screw 26 by means of the handle 27 will cause the nut 25 to move to any of various positions along the screw. The screw is attached to the frame 14 in such a way that it can change its angularity to compensate for the fact that the arm 23 causes the pivot 22 to move along an arc equal to the radius of curvature of the surface 21 which has the same radius of curvature as the length of the arm 23. When the nut 25 has been drawn close to the side of the frame (close to the handle 27), it has the effect of moving the slide 39 closer to the lower end of the lever; that is to say, closer to the sheave 28. This means that the spring 45 is operating on a longer moment arm and is capable of balancing a larger force on the elevator. It is only necessary for the attendant at the dispensing apparatus to turn the handle 27 after a complete load of dishes or new types of articles has been placed on the elevator. He turns the crank until the top of the pile appears at the opening 12, and, as he removes successive elements from the stack on the elevator, the forces will cause the next lower element to move up through the opening, so that there is always an article located at a desired height above the opening 12 ready to be used.

In these instances where a wide range of dynamic adjustability is desired, it is advantageous to secure the follower in its position relative to the lever 21 after adjustment. In other words, while moving pivot pin 22 by means of handle 27, the follower, comprising roller 41 and slide 39, is free to move relative to lever 21, this having the effect of changing the moment as defined between pin 22 and roller 41. However, once the proper setting is achieved a locking device is useful to lock the follower on arm 21. This will prevent any relative movement between follower 41, 39 and lever 21 as the elevator rises, maintaining a constant rate between effective moment arms for the elevator and spring. Such locking may be achieved e.g., by a releasably locking device similar to a vice grip locking wrench.

Figure 2A:
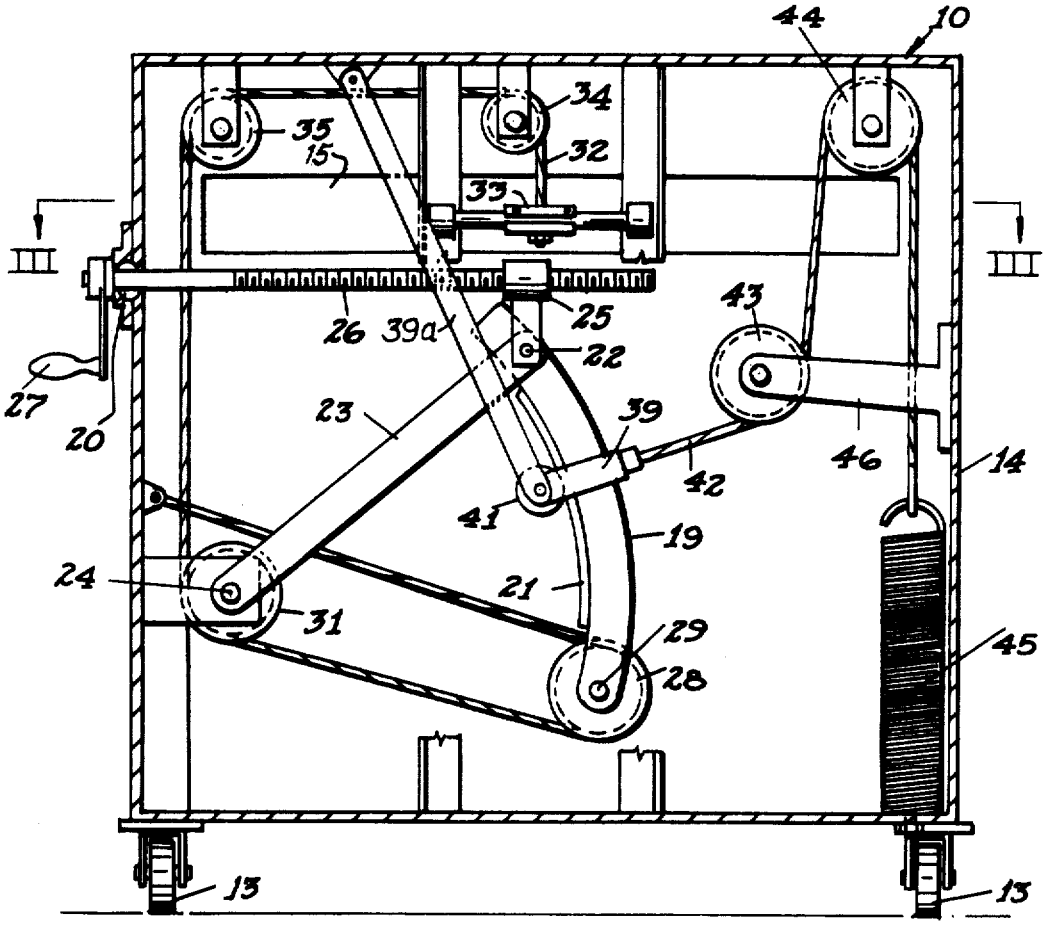
FIG. 2a is a view similar to FIG. 2 showing an alternate means of positioning the follower.

Referring to the embodiment of FIG. 2a, as an alternative, a long pivotal link 39a is mounted at the top of the frame and constrains the roller 41 to an arc during operation. It still permits movement of the pin 22, during adjustment, to cause relative movement between lever 21 and roller 41, with resultant change of the moment arm for the spring load.

It can be seen, therefore, that with the present apparatus a relatively simple construction is obtained, which construction can be used as a mechanism that can be adapted to use with a complete line of dispensers, irrespective of the nature of the elevator, the nature of the enclosure, or of the articles being dispensed. There is no necessity for changing springs, because the type of spring action can be changed without difficulty to match the type of articles being dispensed. This can be done without the need for a skilled mechanic to make the adjustment. The spring constant available to balance the elevator load is linear, due to the curvature of the lever of the surface 21 of the lever 19. The apparatus is of such a nature that it can be built in a very rugged manner, so that its life will be extremely long and there will be no need for any maintenance.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A self-leveling dispensing apparatus, comprising
a. a frame,
b. an elevator supported for vertical movement,
c. a lever mounted on the frame for pivotal movement about an axis at one end, said lever having a curved surface,
d. a spring connected at one end to the frame and at the other end through connection means to an intermediate portion of the lever, e. a first elongated flexible element connecting the other end of the lever to the elevator,
f. said connecting means providing for adjusting the point of connection of the spring to the said intermediate portion, said means including
g. a follower engaging and adjustably movable along the surface of said lever, and
h. said follower connected to the said spring by a second elongated flexible element.

2. The dispensing apparatus as recited in claim 1 including a first pulley having a stationary axis against which said first elongated flexible element is trained between said lever and said elevator and a second pulley having a stationary axis against which said second elongated flexible element is trained between said lever and said spring, said pulleys serving to permit straight line movement of the portions of said flexible elements extending from said pulleys toward said elevator and spring despite displacement of said lever and the portions of said flexible elements connected thereto.

3. A dispensing apparatus as recited in claim 1, wherein the said one end of the lever is connected to one part of the frame by a swingable arm, and wherein an adjustable length element connects the said one end of the lever to another part of the frame substantially spaced from the said one part.

4. A dispensing apparatus as recited in claim 3 wherein the said adjustable length element includes a nut pivotally attached to the lever and a screw extending from the nut to the frame, and wherein a handle is mounted externally of the frame to turn the screw.

5. A dispensing apparatus as recited in claim 4 wherein the screw is connected to the frame for pivotal movement.

6. A dispensing apparatus as recited in claim 3, wherein the radius of curvature of the surface of the lever is the same as the length of the swingable arm.

7. A dispensing apparatus as recited in claim 1 wherein the said one end of the lever is connected to one part of the frame by a swingable arm, means for adjusting the position of said arm, said first flexible element connected to said lever at a point spaced from said one end of said lever a distance substantially corresponding to the length of said swingable arm, and a pulley positioned near the pivot point of said swingable arm, said first flexible element extending about said pivot point, thence to said elevator.

8. The dispensing apparatus of claim 7 wherein said pulley is concentric with the pivot point of said swingable arm.

9. A self-leveling dispensing apparatus, comprising
a. a frame,
b. an elevator supported for vertical movement,
c. a lever constructed and arranged to act as a balanced beam between loads,
d. a spring connected at one end to the frame and at the other end to the lever and providing a first load,
e. means connecting the lever to the elevator to provide a second load,
f. means for adjusting the effective moment arms of at least one of said loads for varying the effective spring rate of the dispenser,
g. said lever being pivotally mounted on a swingable arm mounted on the frame with the position of said arm variable during use of the apparatus,
h. a stationary axis pulley,
i. an elongated flexible element connected to said lever for applying one of said loads and extending from a point on said lever about said pulley thence to said load,
j. said pulley positioned near the mounting of said swingable arm and substantially in line with the path of said lever when it moves about its pivot on said arm, the point of connection of said elongated flexible element to said lever being spaced from said pivot connection to said arm a distance substantially the same as the length of said swingable arm.

10. A dispensing apparatus as recited in claim 9 wherein said elongated flexible element is connected to said lever by means of a pulley carried on said lever, about which said flexible element is looped, one end of said flexible element being secured to said frame.

11. A self-leveling dispensing apparatus, comprising a. a frame, b. an elevator supported for vertical movement, c. a lever constructed and arranged to act as a balanced beam between loads, d. a spring connected at one end to the frame and at the other end to the lever and providing a first load, e. means connecting the lever to the elevator to provide a second load, f. means for adjusting the effective moment arms of at least one of said loads for varying the effective spring rate, said means comprising an adjustable member for moving the fulcrum point of said beam.

12. The dispensing apparatus as recited in claim 11 wherein said fulcrum of said beam is carried on the end of a swingable arm, said arm mounted on the frame, and means to adjust the angular position of said arm, thereby varying the position of the fulcrum along the arc defined by said arm.

13. The dispensing apparatus as recited in claim 12 wherein said fulcrum is permanently positioned at one end of said lever, and the apparatus is constructed and arranged so that rotation of said swingable arm and said fulcrum is effective to move said lever relative to the line of action of said spring.

14. A dispensing apparatus as recited in claim 11 wherein each of said loads is applied to said lever by an elongated flexible element, there being first and second stationary pulleys, and each of said flexible elements extending from said lever about a respective pulley, thence to the respective load.

15. A self-leveling dispensing apparatus, comprising a. a frame, b. an elevator supported for vertical movement, c. a lever mounted on the frame for pivotal movement about an axis at one end, one end, d. a spring connected at one end to the frame and at the other end to an intermediate portion of the lever, e. an elongated flexible element connecting the other end of the lever to the elevator, and f. means for adjusting the point of connection of the spring to the said intermediate portion wherein the said one end of the lever is connected to one part of the frame by a swingable arm, and wherein an adjustable-length element connects the said one end of the lever to another part of the frame substantially spaced from the said one part.

*16. A self-leveling dispensing apparatus, comprising*

*a. a frame,*

*b. an elevator supported for vertical movement,*

*c. a lever mounted on the frame for pivotal movement about an axis at one end, said lever having a curved surface,*

*d. a spring connected at one end to the frame and at the other end through connection means to an intermediate portion of the lever,*

*e. a first elongated flexible element connecting the other end of the lever to the elevator,*

*f. said connecting means providing for adjusting the point of connection of the spring to the said intermediate portion, said means including*

*g. a follower engaging and adjustably movable along the surface of said lever, and*

*h. said follower connected to the said spring.*

References Cited

The following references, cited by the Examiner, are of record in the patented file of this patent or the original patent.

UNITED STATES PATENTS

| | | | |
|---|---|---|---|
| 2,896,790 | 7/1959 | Bell et al. | 312—71 X |
| 2,919,168 | 12/1959 | Shiver | 312—71 |
| 2,934,211 | 4/1960 | Shiver | 312—71 X |
| 3,722,970 | 3/1973 | Healy | 312—71 |

JAMES C. MITCHELL, Primary Examiner

U.S. CL. X.R.

211—49 D; 220—93